US012734668B2

(12) United States Patent
Chen

(10) Patent No.: US 12,734,668 B2
(45) Date of Patent: Sep. 15, 2026

(54) TOOLBOX HANDLE STRUCTURE OF COMBINATION SCREWDRIVER

(71) Applicant: YIH CHENG FACTORY CO., LTD., Nantuo (TW)

(72) Inventor: Wei-Cheng Chen, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 418 days.

(21) Appl. No.: 18/379,643

(22) Filed: Oct. 12, 2023

(65) Prior Publication Data

US 2025/0121486 A1 Apr. 17, 2025

(51) Int. Cl.
*B25G 1/08* (2006.01)
*B25B 15/04* (2006.01)
*B25B 23/00* (2006.01)

(52) U.S. Cl.
CPC .......... *B25G 1/085* (2013.01); *B25B 23/0035* (2013.01); *B25B 15/04* (2013.01)

(58) Field of Classification Search
CPC ...... B25G 1/085; B25B 23/0035; B25B 15/03
USPC .................................. 81/490, 177.4, 177.85
See application file for complete search history.

(56) References Cited

U.S. PATENT DOCUMENTS

| | | | | |
|---|---|---|---|---|
| 4,399,722 A * | 8/1983 | Sardo, Jr. | B25B 23/0035 | 81/177.85 |
| 7,395,739 B1 * | 7/2008 | Chen | B25G 1/085 | 81/439 |
| 7,779,732 B2 * | 8/2010 | Abel | B25G 1/085 | 81/177.4 |
| 7,950,311 B2 * | 5/2011 | Chen | B25G 1/085 | 81/439 |
| 9,180,579 B2 * | 11/2015 | Hsu | B25G 1/08 | |
| 11,148,277 B2 * | 10/2021 | Hu | B25B 23/16 | |
| 11,850,709 B2 * | 12/2023 | Chen | B25B 15/02 | |
| 2022/0305636 A1 * | 9/2022 | Liu | B25B 23/0035 | |

* cited by examiner

*Primary Examiner* — Hadi Shakeri
(74) *Attorney, Agent, or Firm* — HDLS IPR SERVICES; Chun-Ming Shih

(57) ABSTRACT

A toolbox handle structure includes a chamber and a tool slot, and includes an opening on one end. A receiving tube is movably arranged in the chamber. An inner sleeve is inserted in the receiving tube. A bead-holding recess and a hole are disposed on one side adjacent to the opening. A pressing spring is disposed in the inner sleeve to abut against the pressing set. A bead is disposed in the bead-holding recess and pushed by the pressing set to protrude from the hole and abuts the receiving tube. A pressing set is moved by an external force to make the bead fall into the bead-holding recess to be released from abutting against the receiving tube.

6 Claims, 5 Drawing Sheets

TOOLBOX HANDLE STRUCTURE OF COMBINATION SCREWDRIVER

BACKGROUND OF THE DISCLOSURE

Technical Field

The technical field relates to a combination screwdriver, and more particularly relates to a toolbox handle structure of a combination screwdriver.

Description of Related Art

A combination screwdriver is provided for users to replace with different screwdriver bits according to the types of screws to be used. Since the types and specifications of screws are diverse, in order to facilitate the storage and carrying of the screwdriver bits and to prevent those from being lost, a receiving seat may be disposed in the handle to position multiple screwdriver bits.

Moreover, in the receiving seat of the combination screwdriver of the related art, the movable rod is pushed by pressing the button located on the end, and the restoring force of the spring drives the receiving seat in the handle to be released from the abutment for users to pick the screwdriver bits placed on the receiving seat. However, the manner of the receiving seat being pushed by pressing the button may have following problem, such as, after being used for a long time, the spring combined on the bottom of the movable rod may be elastic fatigue, so that the movement of the movable rod may not work properly, and the function of the button may lose its sensitivity after being pressed. Furthermore, as the movable rod is disposed in the handle, a longer tool rod may not be combined therein, and that results in use restrictions.

In view of the above drawbacks, the inventor proposes this disclosure based on his expert knowledge and elaborate researches in order to solve the problems of related art.

SUMMARY OF THE DISCLOSURE

One object of this disclosure is to provide a toolbox handle structure of a combination screwdriver, in which the pressing set is disposed on the cap, and a locking recess structure is disposed on the side of the receiving seat adjacent to the opening. Thus, the stroke of press is shortened to keep the sensitivity of pressing the button.

The other object of this disclosure is to provide a toolbox handle structure of a combination screwdriver, in which the pressing set is disposed on the cap, so that a longer insertion space is provided for inserting a longer tool bar.

This disclosure is a toolbox handle structure of a combination screwdriver. The toolbox handle structure includes a handle, a receiving seat set and a pressing-cap assembly. The handle includes a chamber and a tool slot communicating with each other, and includes an opening defined on one end thereof communicating with the chamber. The receiving seat set includes a receiving tube, an inner sleeve and a push spring elastically abutting the receiving tube. The receiving tube is movably arranged in the chamber. The inner sleeve is inserted in the receiving tube and includes a containing slot. A bead-holding recess and a hole are disposed on the side of the inner sleeve adjacent to the opening. The pressing-cap assembly includes a cap, a pressing set, a pressing spring and a bead. The cap is combined on the opening. The pressing spring is disposed in the containing slot to abut against the pressing set. The pressing set is partially exposed from the cap. The bead is disposed in the bead-holding recess and pushed by the pressing set to protrude from the hole and abut against the receiving tube. The pressing set is moved by an external force, so that the bead falls into the bead-holding recess to be released from abutting against the receiving tube.

In one embodiment of this disclosure, a screw hole is formed at a bottom of the chamber of the handle. A plurality of external threads is disposed on one end of the inner sleeve, and the inner sleeve is combined in the chamber through the external threads being screwed to the screw hole.

In one embodiment of this disclosure, the receiving tube includes a ring seat and a plurality of elastic clips for clamping multiple screwdriver bits. The ring seat includes an annular groove disposed on the side thereof facing the tool slot, and one end of the push spring is located in the annular groove.

In one embodiment of this disclosure, the receiving tube includes a locking recess disposed on an end thereof adjacent to the opening.

In one embodiment of this disclosure, the inner sleeve includes an insertion hole for inserting a tool bar, and the tool bar is inserted in the insertion hole and protrudes from the tool slot.

In one embodiment of this disclosure, the pressing set includes a T-shaped plate and an I-shaped rod. One end of the I-shaped rod is connected to the T-shaped plate, and another end of the I-shaped rod abuts against the pressing spring.

In one embodiment of this disclosure, the T-shaped plate includes a pressing plate and an extension rod. The pressing plate is exposed from the cap. A through hole is disposed on the cap.

The extension rod is inserted in the through hole and abuts against the I-shaped rod.

In one embodiment of this disclosure, the pressing set further includes a C-clip. A groove is disposed on the extension rod, and the C-clip is fastened on the groove.

In one embodiment of this disclosure, the pressing set further includes an outer spring, and the outer spring elastically abuts against the C-clip.

In one embodiment of this disclosure, a size of an outer periphery of the C-clip is larger than that of the through hole.

In comparison with the related art, the toolbox handle structure of a combination screwdriver of this disclosure includes a pressing set disposed on the cap, and a locking recess structure is disposed on the side of the receiving seat adjacent to the opening, so that the stroke of press is shortened to keep the sensitivity of pressing the pressing set. Additionally, since the pressing set is provided at the cap and occupies a small space of the inner sleeve, the inner sleeve provides sufficient insertion space for inserting a longer tool rod to increase the convenience and practicality.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
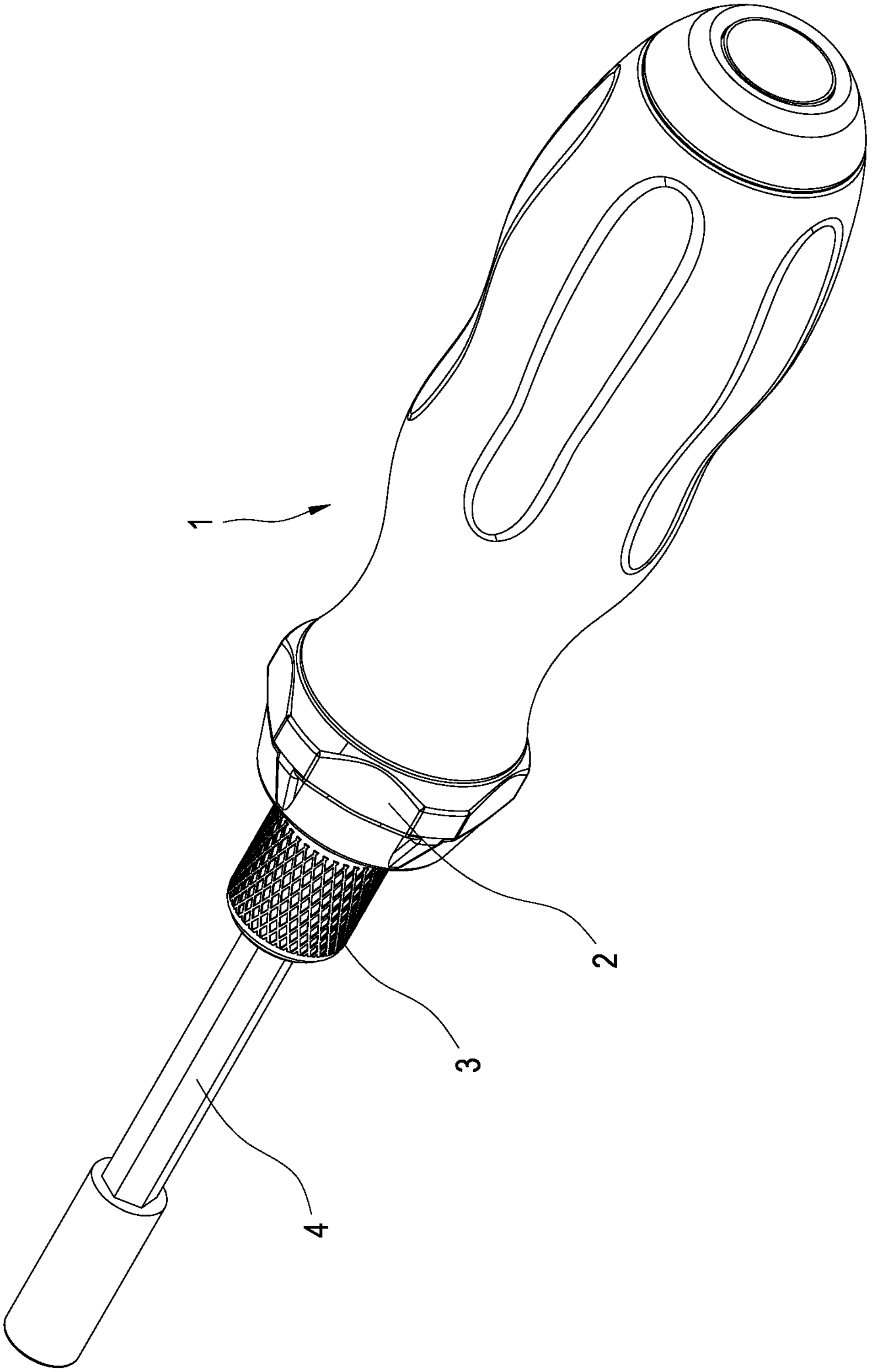
FIG. 1 is a perspective schematic view of the toolbox handle structure of a combination screwdriver in this disclosure.
Figure 2:
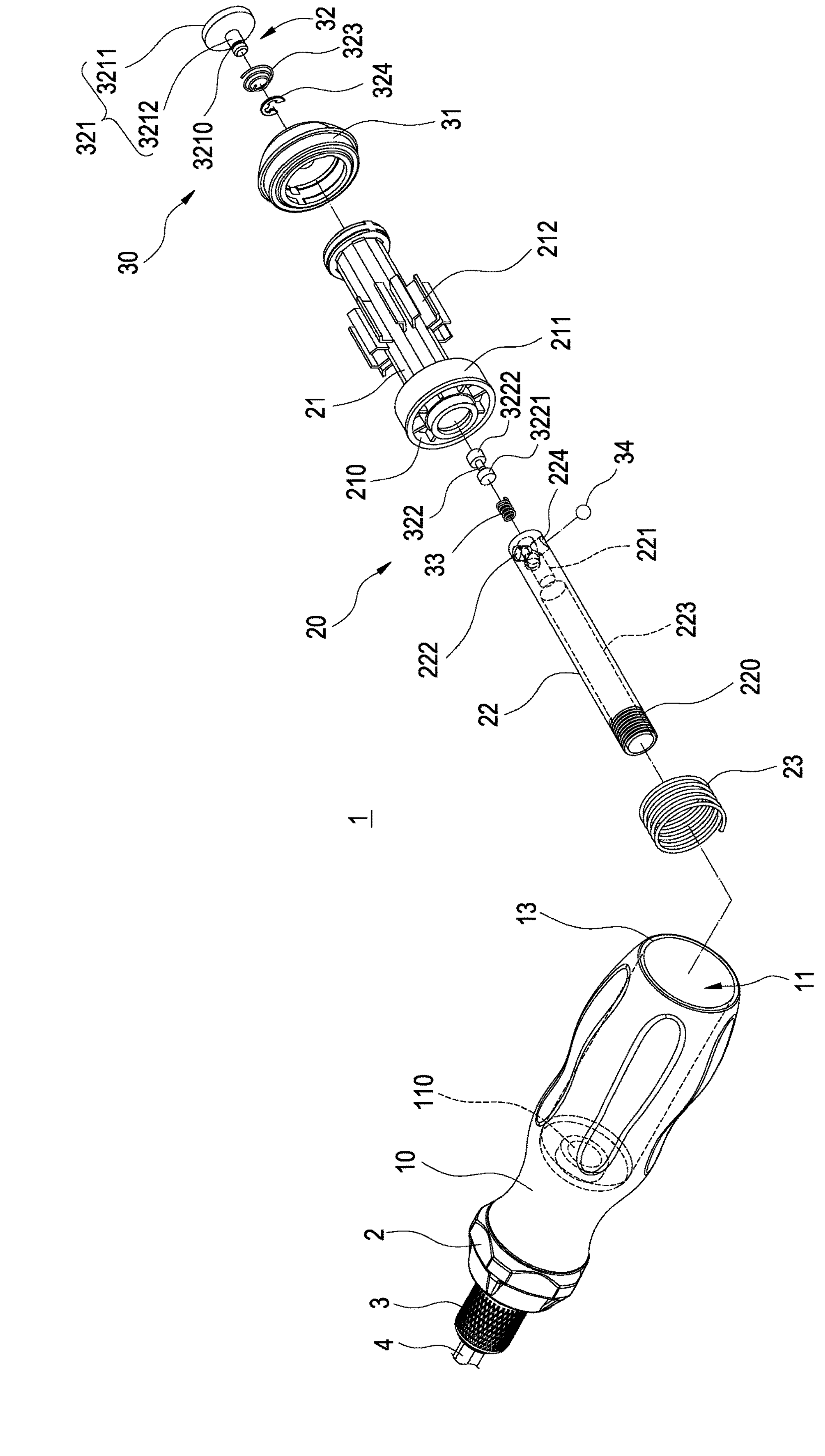
FIG. 2 is a perspective exploded schematic view of the toolbox handle structure of a combination screwdriver in this disclosure.
Figure 3:
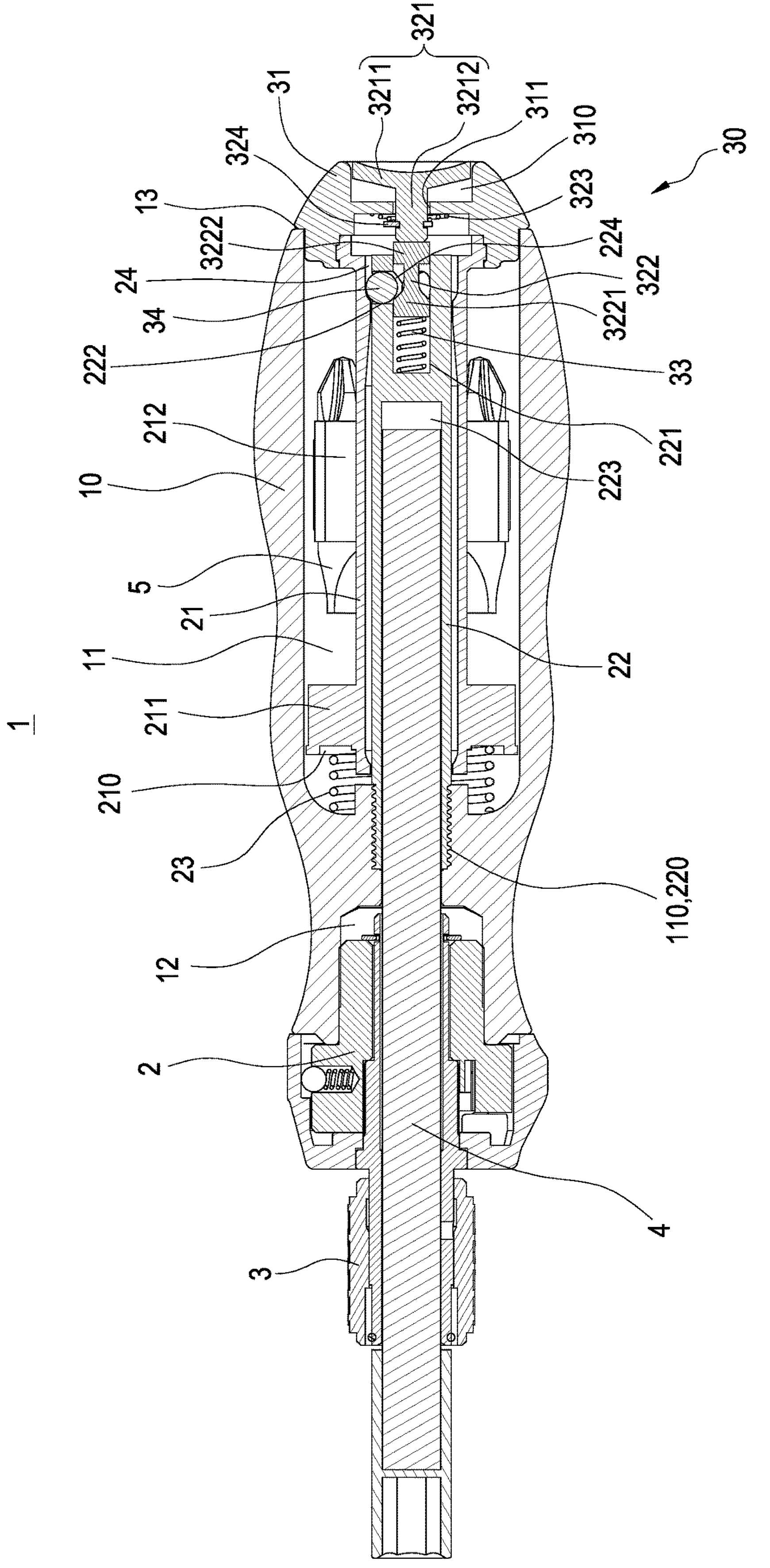
FIG. 3 is a cross sectional view of the toolbox handle structure of a combination screwdriver in this disclosure.

Please refer to FIG. 1 to FIG. 3, which are a perspective schematic view, a perspective exploded schematic view and a cross sectional view of the toolbox handle structure of a combination screwdriver in this disclosure. This disclosure is a toolbox handle structure 1 of a combination screwdriver. The toolbox handle structure 1 includes a handle 10, a receiving seat set 20 and a pressing-cap assembly 30. The receiving seat set 20 is disposed in the handle 10. The pressing-cap assembly 30 is combined on one end of the handle 10 to constitute the toolbox handle structure 1. More detailed of the toolbox handle structure 1 is described as follow.

The handle 10 includes a chamber 11 and a tool slot 12 communicating with each other, and one end of the handle 10 includes an opening 13 communicating with the chamber 11. The tool slot 12 may be provided for arranging a ratchet set or other tool joints for inserting a ratchet, a rod set or a screwdriver, etc.

In one embodiment of this disclosure, the toolbox handle structure 1 further includes a quick release seat 2 and a ratchet set 3. The quick release seat 2 is combined in the tool slot 12 to lock and position a tool rod 4. The ratchet set 3 is arranged on the outside of the quick release seat 2 to restrict the rotation direction of the tool rod 4.

The receiving seat set 20 includes a receiving tube 21, an inner sleeve 22 and a push spring 23. The push spring 23 elastically abuts against the receiving tube 21. The receiving tube 21 is movably arranged in the chamber 11 and includes a locking recess 24 disposed on an end thereof adjacent to the opening 13. The inner sleeve 22 is inserted in the receiving tube 21 and includes a containing slot 221. The inner sleeve 22 includes a hole 222 and a bead-holding recess 224 disposed on the side thereof adjacent to the opening 13.

The receiving tube 21 includes a ring seat 211 and a plurality of elastic clips 212 for clamping multiple screwdriver bits 5. The ring seat 211 includes an annular groove 210 disposed on the side thereof facing the tool slot 12. Additionally, one end of the push spring 23 is located in the annular groove 210.

In this embodiment, a screw hole 110 is formed at the bottom of the chamber 11 of the handle 10. A plurality of external threads 220 are disposed on one end of the inner sleeve 22. The inner sleeve 22 is combined in the chamber 11 through the external threads 220 being screwed into the screw hole 110. Moreover, the inner sleeve 22 includes an insertion hole 223 for inserting a tool bar 4. The tool bar 4 is inserted in the insertion hole 223 and protrudes from the tool slot 12.

Furthermore, the pressing-cap assembly 30 includes a cap 31, a pressing set 32, a pressing spring 33 and a bead 34. The cap 31 is combined on the opening 13 at one end of the handle 10 and covers the chamber 11. The pressing spring 33 is disposed in the containing slot 221 to abut against the pressing set 32. The pressing set 32 is partially exposed from the cap 31. The bead 34 is disposed in the bead-holding recess 224 and is pushed by the pressing set 32 to protrude from the hole 222 and abut against the receiving tube 21. In this embodiment, the bead-holding recess 224 is disposed on the inner wall of the containing slot 221 of the inner sleeve 22.

When the bead 34 protrudes from the opening 222 and abuts against the locking recess 24 of the receiving tube 21, the receiving tube 21 is abutted by the bead 34 and positioned in the chamber 11 of the handle 10.

Specifically, the pressing set 32 includes a T-shaped plate 321 and an I-shaped rod 322. One end of the I-shaped rod 322 is connected to the T-shaped plate 321, and another end of the I-shaped rod 322 abuts against the pressing spring 33. Additionally, the T-shaped plate 321 includes a pressing plate 3211 and an extension rod 3212. The pressing plate 3211 is exposed from the cap 31.

In this embodiment, a pressing slot 310 and a through hole 311 are disposed on the cap 31. The pressing plate 3211 is movably disposed in the pressing slot 310. The extension rod 3212 is inserted in the opening 311 and abuts against the I-shaped rod 322. In addition, two ends of the I-shaped rod 322 have a first protrusion 3221 and a second protrusion 3222 respectively.

In some embodiments of this disclosure, the pressing set 32 further includes an outer spring 323 and a C-clip 324. Furthermore, a groove 3210 is disposed on the extension rod 3212. The C-clip 324 is fastened on the groove 3210. The outer spring 323 elastically abuts against the C-clip 324.

It is worth noticing that the outer spring 323 is provided to assist the T-shaped plate 321 to return to its original position after being pressed. Moreover, a size of the outer periphery of the C-clip 324 is larger than that of the through hole 311. The C-clip 324 is provided to position the outer spring 323 and prevent the extension rod 3212 from moving out of the through hole 311.

Figure 4:
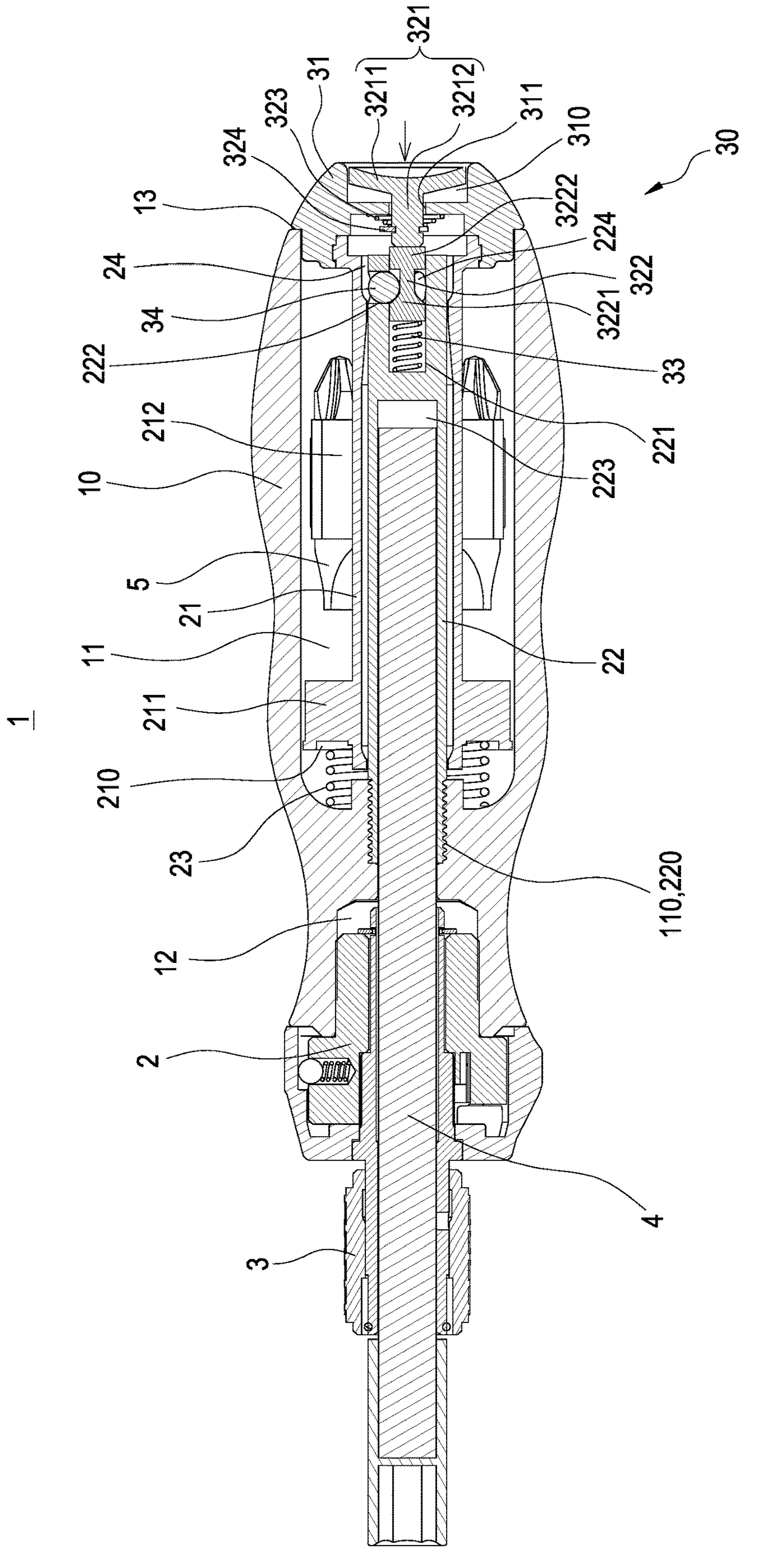
FIG. 4 is a schematic view of pressing the toolbox handle structure of a combination screwdriver in this disclosure.
Figure 5:
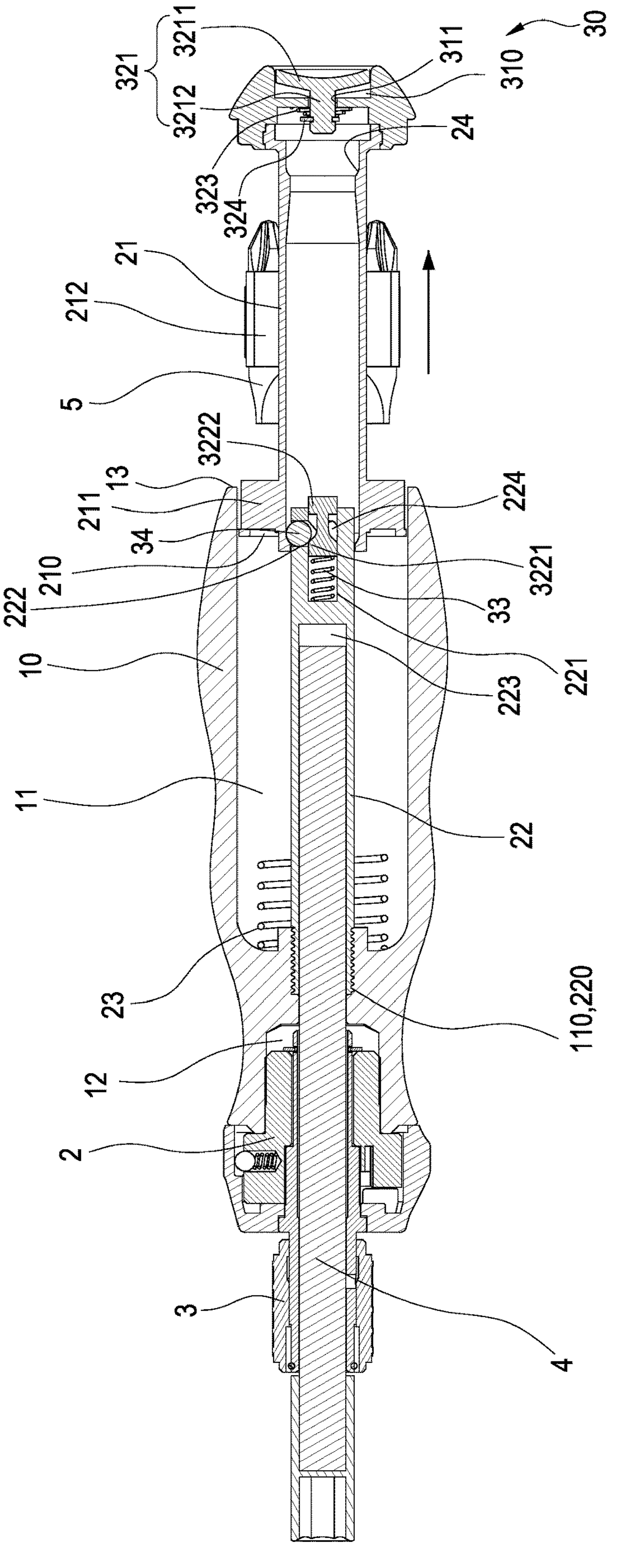
FIG. 5 is a schematic view of ejecting the toolbox handle structure of a combination screwdriver in this disclosure.

Please further refer to FIG. 4 and FIG. 5, which are a schematic view of pressing the toolbox handle structure of a combination screwdriver in this disclosure and a schematic view of ejecting the receiving tube in this disclosure. The toolbox handle structure 1 of a combination screwdriver of this disclosure is an ejectable type of the toolbox handle structure 1. When using the handle tool box structure 1, a force is applied on the pressing plate 3211 of the T-shaped plate 321, and the pressing plate 3211 is pushed toward the inside of the handle 10.

Moreover, the extension rod 3212 of the T-shaped plate 321 pushes the I-shaped rod 322, and the I-shaped rod 322 is pushed to press the pressing spring 33. Then, the beads 34 that abuts the locking recess 24 of the receiving tube 21 may fall into the bead-holding recess 224 as the I-shaped rod 322 moves.

Specifically, when the I-shaped rod 322 moves toward the pressing spring 33, the bead 34 is disengaged from the blocking of the first protrusion 3221 and falls from the opening 222 into the bead-holding recess 224. Then, the receiving seat 20 is released from the abutment of the bead 34. Subsequently, under the elastic push of the push spring 23, the receiving tube 21 moves out of the chamber 11 for users to pick the needed screwdriver bit 5.

It should be noted that when the receiving tube 21 is to be pushed into the handle 10, the cap 31 needs to be pushed to the opening 13 of the handle 10 first. Then, force is applied to the pressing plate 3211 to push the handle 10 inward. Thus, the I-shaped rod 322 moves toward the pressing spring 33, and the bead 34 that locates in the bead-holding recess 224 may be pushed by the second protrusion 3222 and moves into the opening 222 from the bead-holding recess 224. After the receiving tube 21 moving into the cavity 11, the bead 34 abuts the locking recess 24 again to position the receiving tube 21 in the handle 10.

While this disclosure has been described by means of specific embodiments, numerous modifications and variations could be made thereto by those skilled in the art without departing from the scope and spirit of this disclosure set forth in the claims.

What is claimed is:

1. A toolbox handle structure of a combination screwdriver, the toolbox handle structure comprising:

a handle, comprising a chamber and a tool slot communicating with each other, and comprising an opening defined on one end thereof communicating with the chamber;

a receiving seat set, comprising a receiving tube, an inner sleeve and a push spring, the push spring elastically abutting against the receiving tube, wherein the receiving tube is movably arranged in the chamber, the inner sleeve is inserted in the receiving tube and comprises a containing slot, and a bead-holding recess and a hole are defined on one side of the inner sleeve adjacent to the opening; and a pressing-cap assembly, comprising a cap, a pressing set, a pressing spring and a bead, wherein the cap is combined on the opening, the pressing spring is disposed in the containing slot and abuts against the pressing set, the pressing set is partially exposed from the cap, and the bead is disposed in the bead-holding recess and pushed by the pressing set to protrude from the hole and abuts against the receiving tube;

wherein the pressing set is moved by an external force to make the bead fall into the bead-holding recess to be released from abutting against the receiving tube;

wherein the pressing set comprises a T-shaped plate and an I-shaped rod, one end of the I-shaped rod is connected to the T-shaped plate, and another end of the I-shaped rod abuts against the pressing spring;

the T-shaped plate comprises a pressing plate and an extension rod, the pressing plate is exposed from the cap, a through hole is defined on the cap, and the extension rod is inserted in the through hole and abuts against the I-shaped rod;

the pressing set further includes a C-clip, a groove is defined on the extension rod, and the C-clip is fastened on the groove; and the pressing set further comprises an outer spring, and the outer spring elastically abuts against the C-clip.

2. The toolbox handle structure according to claim 1, wherein a screw hole is defined on a bottom of the chamber of the handle, the inner sleeve comprises a plurality of external threads disposed on one end thereof, and the inner sleeve is combined in the chamber through the external threads being screwed to the screw hole.

3. The toolbox handle structure according to claim 1, wherein the receiving tube comprises a ring seat and a plurality of elastic clips, the elastic clips configured to clamp a plurality of screwdriver bits, the ring seat comprises an annular groove defined on a side thereof facing the tool slot, and one end of the push spring is located in the annular groove.

4. The toolbox handle structure according to claim 1, wherein the receiving tube comprises a locking recess defined on an end thereof adjacent to the opening.

5. The toolbox handle structure according to claim 1, wherein the inner sleeve comprises an insertion hole, and a tool bar is inserted in the insertion hole and protrudes from the tool slot.

6. The toolbox handle structure according to claim 1, wherein a size of an outer periphery of the C-clip is larger than that of the through hole.

* * * * *